(12) United States Patent
Kawakami et al.

(10) Patent No.: US 6,208,610 B1
(45) Date of Patent: Mar. 27, 2001

(54) ADJUSTABLE OPTICAL PICKUP DEVICE WITH MEANS FOR REMOVING STRAY LIGHT

(75) Inventors: Takashi Kawakami, Tokyo; Tokio Kanada, Kanagawa, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/011,019
(22) PCT Filed: Jun. 9, 1997
(86) PCT No.: PCT/JP97/01964
  § 371 Date: Jun. 8, 1998
  § 102(e) Date: Jun. 8, 1998
(87) PCT Pub. No.: WO97/47003
  PCT Pub. Date: Dec. 11, 1997

(30) Foreign Application Priority Data

Jun. 7, 1996 (JP) .................................................. 8-146340

(51) Int. Cl.[7] ...................................................... G11B 7/00
(52) U.S. Cl. ................................. 369/112.01; 369/112.03
(58) Field of Search .................................. 369/106, 107, 369/109, 112, 116, 119

(56) References Cited

FOREIGN PATENT DOCUMENTS

| 0634742 A1 | 1/1995 | (EP) | G11B/7/13 |
|---|---|---|---|
| 60-43229 | 3/1985 | (JP) | G11B/7/08 |
| 62-65247 | 3/1987 | (JP) | G11B/7/135 |
| 6-349100 | 12/1994 | (JP) | G11B/7/135 |

*Primary Examiner*—Paul W. Huber
(74) *Attorney, Agent, or Firm*—Limbach & Limbach L.L.P.

(57) ABSTRACT

An optical pickup device including a light source, an objective lens for converging a light beam outgoing from said light source, a beam splitter arranged between the light source and the objective lens for splitting the light beam radiated from the light source from a light beam incident thereon via the objective lens and a photodetector for receiving the light beam split by the beam splitter and incident on it via the objective lens. The optical pickup device also includes irregularities or an inclined surface for scattering stray light components produced when a light beam outgoing from the light source is passed through the beam splitter for preventing the stray light components from entering the photodetector for improving detection accuracy of the photodetector.

10 Claims, 8 Drawing Sheets

US 6,208,610 B1

ADJUSTABLE OPTICAL PICKUP DEVICE WITH MEANS FOR REMOVING STRAY LIGHT

TECHNICAL FIELD

This invention relates to an optical pickup device for writing or reading out information signals on or from an optical recording medium, as a recording medium for information signals, such as an optical disc.

BACKGROUND ART

Up to now, a device configured as shown in FIG. 1 is used as an optical pickup device for reading out information signals recorded on an optical disc, such as a magneto-optical disc.

This optical pickup device includes a semiconductor laser 2 for radiating a light beam $L_1$ illuminated on an optical disc 1 and an objective lens 3 for converging the light beam $L_1$ outgoing from the semiconductor laser 2 for illumination on the optical disc 1, as shown in FIG. 1.

On the light path of the light beam $L_1$ from the semiconductor laser 22 to the objective lens 3 is a grating 4 disposed towards the semiconductor laser 2 for splitting the light beam $L_1$ outgoing from the semiconductor laser 2 into at least three diffracted light beams, namely a zero-order light beam and ±1 order light beams, as shown in FIGS. 1 and 2.

It is noted that, in FIGS. 1 and 2, the three diffracted light beams are represented as a sole light beam and these three diffracted light beams are referred to simply as a light beam in keeping with the drawing.

On the light path from the grating 4 to the objective lens 3 are disposed a beam splitter 5 and a reflective mirror 6. The beam splitter 5 splits the light beam $L_1$ outgoing from the semiconductor laser 2 from a light beam $L_2$ reflected by the optical disc 1 to fall on the beam splitter 5 via objective lens 3, while the reflective mirror 6 causes the light beam $L_1$ transmitted through the beam splitter 5 to be deflected 90° to fall on the objective lens 3 while causing the light beam $L_2$ reflected by the optical disc 1 and transmitted through the objective lens 3 to be deflected 90° to fall on the beam splitter 5.

The optical pickup device includes a photodetector 7 for detecting the return light beam $L_2$ reflected back from the optical disc 1 to read out the information signals recorded on the disc and for detecting focusing error signals and tracking error signals. The photodetector is comprised of a light detecting element, such as a photodiode. This photodetector 7 is arranged facing the beam splitter 5 at a position perpendicular to the light path from the semiconductor laser 2 to the objective lens 3 for detecting the return light beam $L_2$ the light path of which has been modified 90° by being reflected back by a boundary surface 5a of the beam splitter 5. Meanwhile, the boundary surface 5a of the beam splitter 5 is inclined 45° relative to the optical axis of the light beam incident on the beam splitter 5 for modifying the light path of the light beam incident on the beam splitter 5 by 90°.

In the light path from the beam splitter 5 to the photodetector 7 are arranged a Wollaston prism 8 for detecting the Kerr rotation angle of the return light beam $L_2$ reflected by the optical disc 1 and a cylindrical lens 9 for producing astigmatic aberration in the return light beam $L_2$. The Wollaston prism 8 is mounted as-one with the beam splitter 5.

The present optical pickup device has a photodiode 10 for detecting part of the light beam $L_1$ radiated from the front side of the semiconductor laser 2 for controlling the semiconductor laser 2 to render the output level of the light beam radiated from the semiconductor laser 2 substantially constant. This photodiode 10 is arranged facing the beam splitter 5 at a position perpendicular to the light path from the semiconductor laser 2 to the objective lens 3 for detecting a portion of the light beam $L_1$ from the semiconductor laser 2 having its light path changed 90° by being reflected back by a boundary surface 5a of the beam splitter 5.

The detection output of the photodiode 10 is supplied to an automatic output control circuit 12 configured for controlling the intensity of the driving current supplied from a driving source 11 configured for driving the semiconductor laser 2. The automatic output control circuit 12 is responsive to a detection output of the photodiode 10 to control the driving current supplied from the driving source 11 so that the semiconductor laser 2 will radiate the light beam $L_1$ of a constant output level.

Meanwhile, since the return light beam $L_2$ incident on the photodetector 7 and a portion $L_3$ of the light beam $L_1$ radiated from the semiconductor laser 2 to fall on the photodiode 10 are changed in light paths by being reflected by the common boundary surface 5a of the sole beam splitter 5, the photodetector 7 and the photodiode 10 are arranged facing each other on both sides of the beam splitter 5 as shown in FIG. 2.

In the above-described optical pickup device, if the driving current is supplied from the driving source 11 for driving the semiconductor laser 2, the light beam $L_1$ is radiated from the semiconductor laser 2. The light beam $L_1$ radiated from the front side of the semiconductor laser 2 is split by the grating 4 into at least three diffracted light beams to fall on the beam splitter 5. The portion $L_3$ of the light beam $L_1$ from the semiconductor laser 2, having its light path changed 90° by the boundary surface 5a of the beam splitter 5, is received by the photodiode 10 whereby the intensity of the portion $L_3$ of the light beam 1 is converted to an electrical signal which is detected. This detection output is supplied to an output control circuit 12 for controlling the driving current supplied from the driving source 11 to the semiconductor laser 2 for controlling the driving of the semiconductor laser 2 for providing a constant output level of the light beam $L_1$ radiated from the semiconductor laser 2.

The light beam $L_1$, transmitted through the beam splitter 5 without being reflected by the boundary surface 5a of the beam splitter 5, falls on the reflective mirror 6 so as to be thereby changed in light path by 90° to then fall on the objective lens 3. The light beam $L_1$, reflected by the reflective mirror 6, is converged by the objective lens 3 on the signal recording surface of the optical disc 1. The light beam $L_2$, reflected by the signal recording surface of the optical disc 1, again falls via objective lens 3 on the reflective mirror 6 so as to be thereby re-converted in light path by 90°. The light beam $L_2$, the light path of which has been changed by 90° by the reflective mirror 6, falls on the beam splitter 5 to be then reflected by 90° by the boundary surface 5a. The light beam $L_2$, reflected by 90° by the reflective mirror 6, falls on the Wollaston prism 8 for detecting the Kerr effect so as to be then received via cylindrical lens 9 by the photodetector 7.

Due to the cylindrical lens 9, the light beam $L_2$ reflected by 90° by the boundary surface 5a undergoes astigmatic aberration depending on changes in the distance between the objective lens 3 and the signal recording surface of the optical disc 1. The result is that the spot shape is changed on the light receiving surface of the photodetector 7 depending on changes in the distance between the signal recording surface of the optical disc 1 and the objective lens 3, so that focusing error signals are produced based on an output signal of the photodetector 7. On the other hand, each spot corresponding to the ±one order diffracted light on the light receiving surface of the photodetector 7 is moved depending on how much the light spot of each of the ±one order diffracted light beams on both sides of the spot of the zero order diffracted light beam radiated on the signal recording surface of the optical disc 1 is shifted relative to the recording track of the optical disc 1. The result is that the output signal of the photodetector 7 is changed so that the tracking error signals can be generated based on the changes in the output signal of the photodetector 7. Moreover, the information signals recorded on the optical disc 1 can be read out based on the output signal of the photodetector 7 receiving the zero-order diffracted light.

Since the above-described optical pickup device controls the light beam $L_1$ outgoing from the semiconductor laser 2 to a constant output level, the photodetector 10 for detecting part of the light beam $L_1$ radiated from the semiconductor laser 2 is arranged towards the light path of the light beam $L_1$ proceeding from the semiconductor laser 2 to the objective lens 3. Since the photodetector 10 is configured for detecting part of the light beam $L_1$ reflected by the boundary surface 5a of the beam splitter 5, the photodetector 10 needs to be provided at a position at right angles to the light path of the light beam $L_1$ proceeding from the semiconductor laser 2 to the objective lens 3. Moreover, the photodetector 10 needs to be arranged facing the photodetector 7, adapted for detecting the return light beam $L_2$ reflected from the optical disc 1, with the beam splitter 5 in-between.

If the photodetector 10 is arranged in this manner, the direction perpendicular to the light path from the semiconductor laser 2 to the objective lens 3 is increased in width, thus excessively increasing the size of the optical pickup device itself. If the optical pickup device is increased in size, the optical disc recording and/or reproducing apparatus is also increased in size.

Thus, an optical pickup device shown in FIG. 3 has so far been proposed, which is reduced in size for enabling size reduction of the disc recording and/or reproducing apparatus employing the optical pickup device and which can be controlled for prohibiting fluctuations in the output level of the outgoing light beam for assuring a substantially constant output level of the light beam.

The optical pickup device shown in FIG. 3 has, in a casing 14 housing the semiconductor laser 2, a photodiode 15 for receiving the light beam radiated towards the back side of the semiconductor laser 2. This photodiode 15 detects the intensity of the light beam radiated by the photodiode 10 towards the back surface of the semiconductor laser 2. This detection output is sent to an automatic control circuit 12 configured for controlling the intensity of the driving current supplied from the driving source 11 for driving the semiconductor laser 2. This automatic control circuit 12 is responsive to a detection output detected by the photodiode 10 for controlling the intensity of the driving current supplied from the driving source 11. The semiconductor laser 2 is driven by the driving current, the intensity of which is controlled depending on the intensity of the light beam radiated from the semiconductor laser 2, for radiating the light beam $L_1$ of a perpetually constant output level.

By providing the photodiode 15 for detecting the light beam radiated towards the back side of the semiconductor laser 2, it becomes unnecessary to provide the photodiode 10 for detecting part of the light beam $L_1$ radiated towards the front side of the semiconductor laser 2, so that the direction perpendicular to the light path from the semiconductor laser 2 to the objective lens 3 can be reduced in width to render it possible to reduce the size of the optical pickup device itself and the optical disc recording and/or reproducing apparatus employing the optical pickup device.

However, part of the light beam $L_1$ radiated from the semiconductor laser 2 to fall on the beam splitter 5 is reflected by the boundary surface 5a of the beam splitter 5. The portion $L_3$ of the light beam $L_1$ reflected by the boundary surface 5a has its light path changed by 90° to proceed towards a base member 16 carrying the beam splitter 5 or the grating 4. The base member 16 is formed of metal, such as aluminum, and hence is high in reflectivity. Thus, the light beam $L_3$ directed to the base member 16 is reflected by its surface to return again towards the beam splitter 5. The light beam $L_3$ reflected towards the beam splitter 5 proves to be a stray light component which is passed through the beam splitter 5 to fall on the photodetector 7. If the stray light, which is the light beam $L_3$ other than the return light beam $L_2$ reflected by the optical disc 1, falls on the photodetector 7, it becomes impossible to detect the return light beam $L_2$ correctly by the photodetector 7.

If the return light beam $L_2$ cannot be detected correctly, it becomes impossible to detect the focusing error signals or tracking error signals correctly, such that it becomes impossible to perform focusing control of displacing the objective lens 3 along the optical axis for tracking control of displacing the objective lens 3 in the planar direction perpendicular to the direction of the optical axis of the objective lens 3. Thus, it becomes impossible to correctly scan the recording track formed on the optical disc 1 by the light beam $L_1$ converged by the objective lens 3 to be illuminated on the signal recording surface of the optical disc 1, such that it becomes impossible to read out the information signals correctly.

On the other hand, part of the light beam $L_3$ reflected by the surface of the base member 16 to fall again on the beam splitter 5 is reflected by the boundary surface 5a of the beam splitter 5 so as to be deflected by 90° in its light path and directed towards the semiconductor laser 2. The light beam $L_3$ returned towards the semiconductor laser 2 interacts with the light beam $L_1$ outgoing from the semiconductor laser 2 to cause resonance to generate so-called scoop noise. This renders the output level of the light beam $L_1$ outgoing from the semiconductor laser 2 and the output level of the return light beam $L_2$ detected by the photodetector 7 unstable. Consequently, the focusing error signals or tracking error signals cannot be detected correctly by the photodetector 7, such that information signals cannot be read out correctly.

DISCLOSURE OF THE INVENTION

It is an object of the present invention to provide an optical pickup device capable of correctly detecting a light beam incident thereon via an objective lens.

It is another object of the present invention to provide an optical pickup device capable of removing stray light components produced when a light beam outgoing from the light source is passed through the beam splitter for enabling the light beam incident thereon via object lens to be detected correctly by a photodetector.

It is a further object of the present invention to provide an optical pickup device capable of radiating a light beam of a stable output level to render it possible to read out the information signals correctly.

It is a further object of the present invention to provide an optical pickup device capable of adjusting the mounting position of the beam splitter configured for splitting the light beam outgoing from the light source from a light beam incident thereon via objective lens for enabling correct incidence of the light beam on the photodetector.

It is yet another object of the present invention to provide an optical pickup device that can be reduced in size for reducing the size of the disc recording and/or reproducing apparatus.

For accomplishing these objects, the present invention provides an optical pickup device including a light source, an objective lens for converging a light beam outgoing from the light source, a beam splitter arranged between the light source and the objective lens for splitting the light beam radiated from the light source from a light beam incident thereon via the objective lens, a photodetector for receiving the light beam split by the beam splitter and incident thereon via the objective lens and means for removing stray light components generated when the light beam radiated from the light source is passed through the beam splitter.

The optical pickup device also includes a holder for holding at least the beam splitter. The means for removing the stray light components produced when a light beam outgoing from the light source is passed through the beam splitter is provided at a position of the holder facing the beam splitter.

The optical pickup device also includes a base member carrying at least the light source and the photodetector. The holder having the removing means for removing the stray light components has an opening via which a light beam from the light source is intruded and a mounting portion for mounting the beam splitter. The mounting portion is arranged on a straight line passing through the opening, the holder including a planar surface for abutment against the base member mounted for adjustment in movement on the base member. The holder includes a planar surface for abutment against the base member for adjustment in movement of the holder on the base member.

The optical element is arranged between the beam splitter and the photodetector, and is arranged substantially at right angles with a straight line passing through the opening in the holder at a position of facing the removing means with the beam splitter in-between.

The removing means for removing the stray light components produced when a light beam outgoing from the light source is passed through the beam splitter may be constituted by irregularities formed on a lateral side of the holder.

The removing means may also be constituted by an inclined surface formed on a lateral side of the holder.

Other objects and specified advantages of the present invention will become clear from the following description of the preferred embodiments of the invention.

BEST MODE FOR CARRYING OUT THE INVENTION

Figure 1:
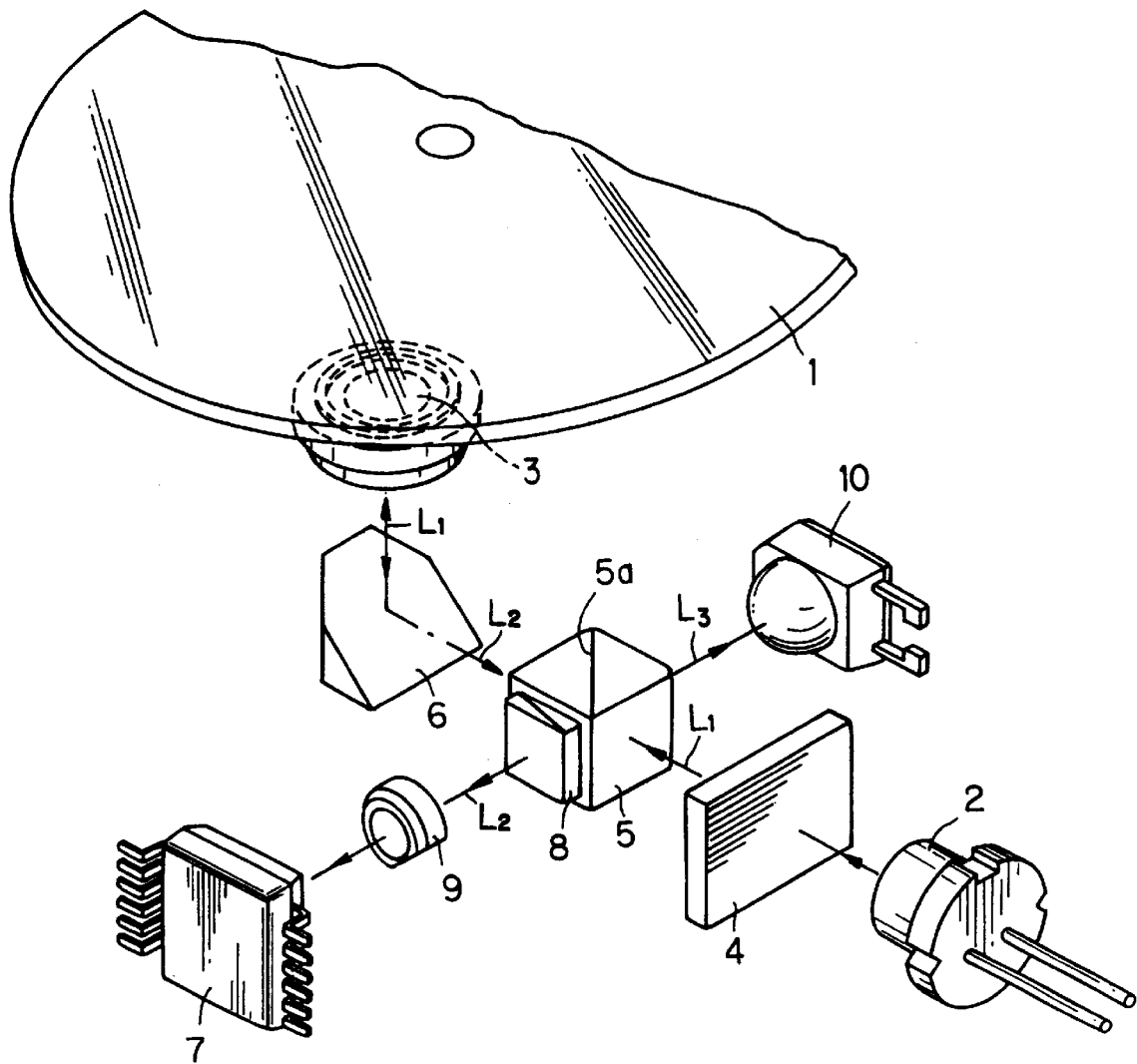
FIG. 1 is a perspective view showing ane arrangement of a semiconductor laser and optical devices making up a conventional optical pickup device.
Figure 2:
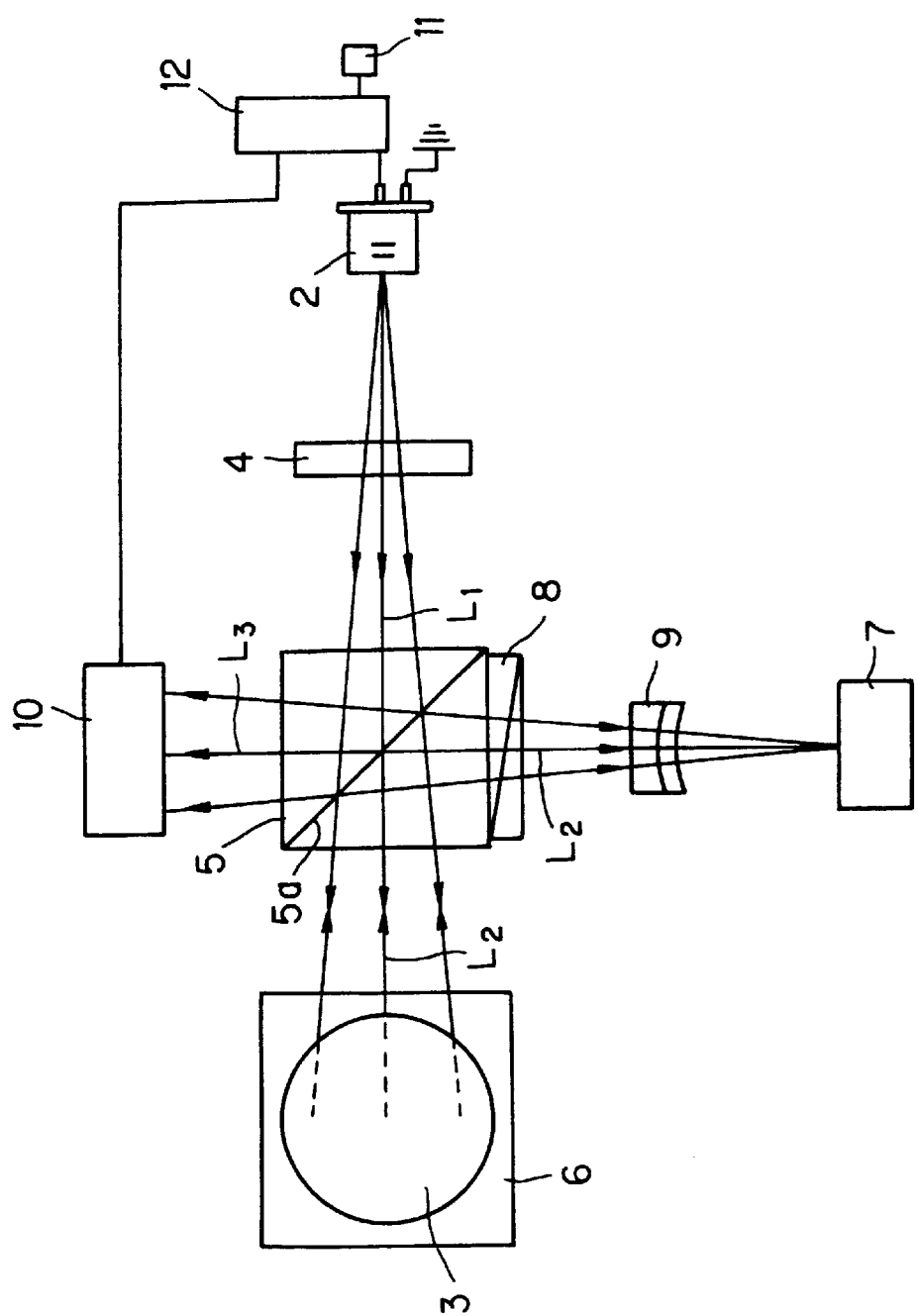
FIG. 2 is a plan view showing the optical pickup device of FIG. 1.
Figure 3:
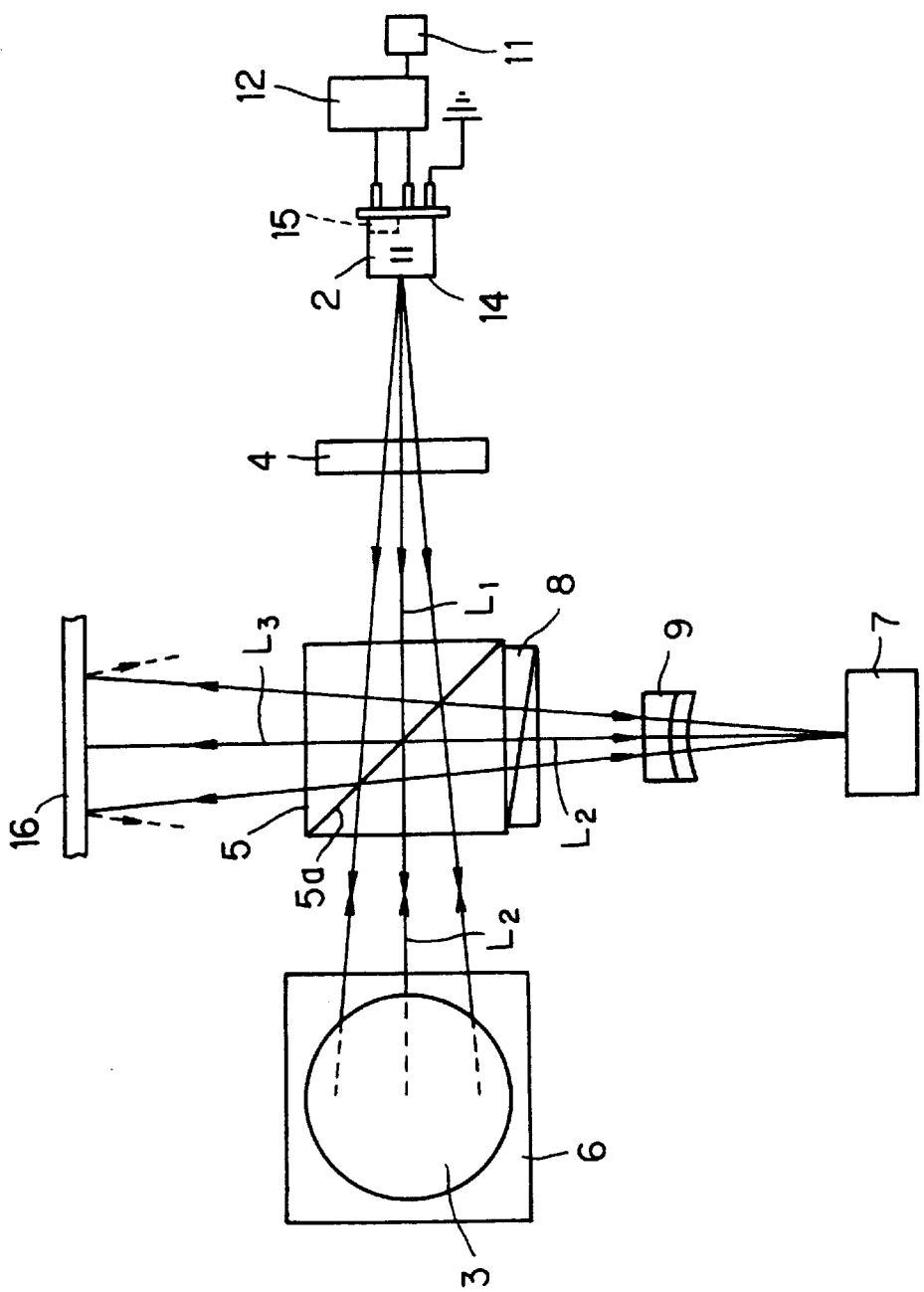
FIG. 3 is a plan view showing another example of the conventional optical pickup device.

Referring to the drawings, a preferred embodiment of an optical pickup device according to the present invention will be explained in detail.

The optical pickup device according to the present invention includes a semiconductor laser 21, operating as a light source radiating a light beam, and an objective lens 22 for converging a light beam $L_1$ outgoing from the semiconductor laser 21 for illumination on the signal recording surface of the optical disc 20 as an optical recording medium.

Figure 6:
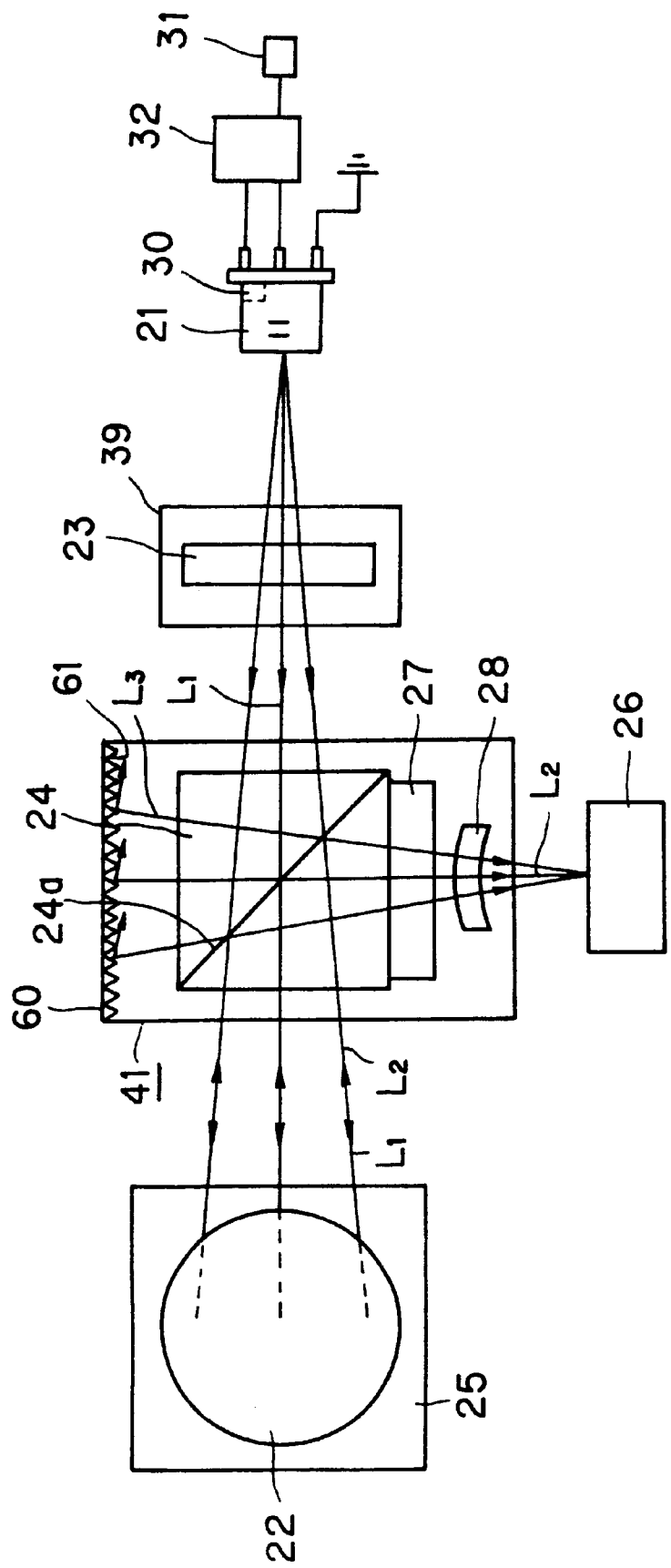
FIG. 6 is a plan view showing the light path of an light beam in the optical pickup device shown in FIG. 4.
Figure 7:
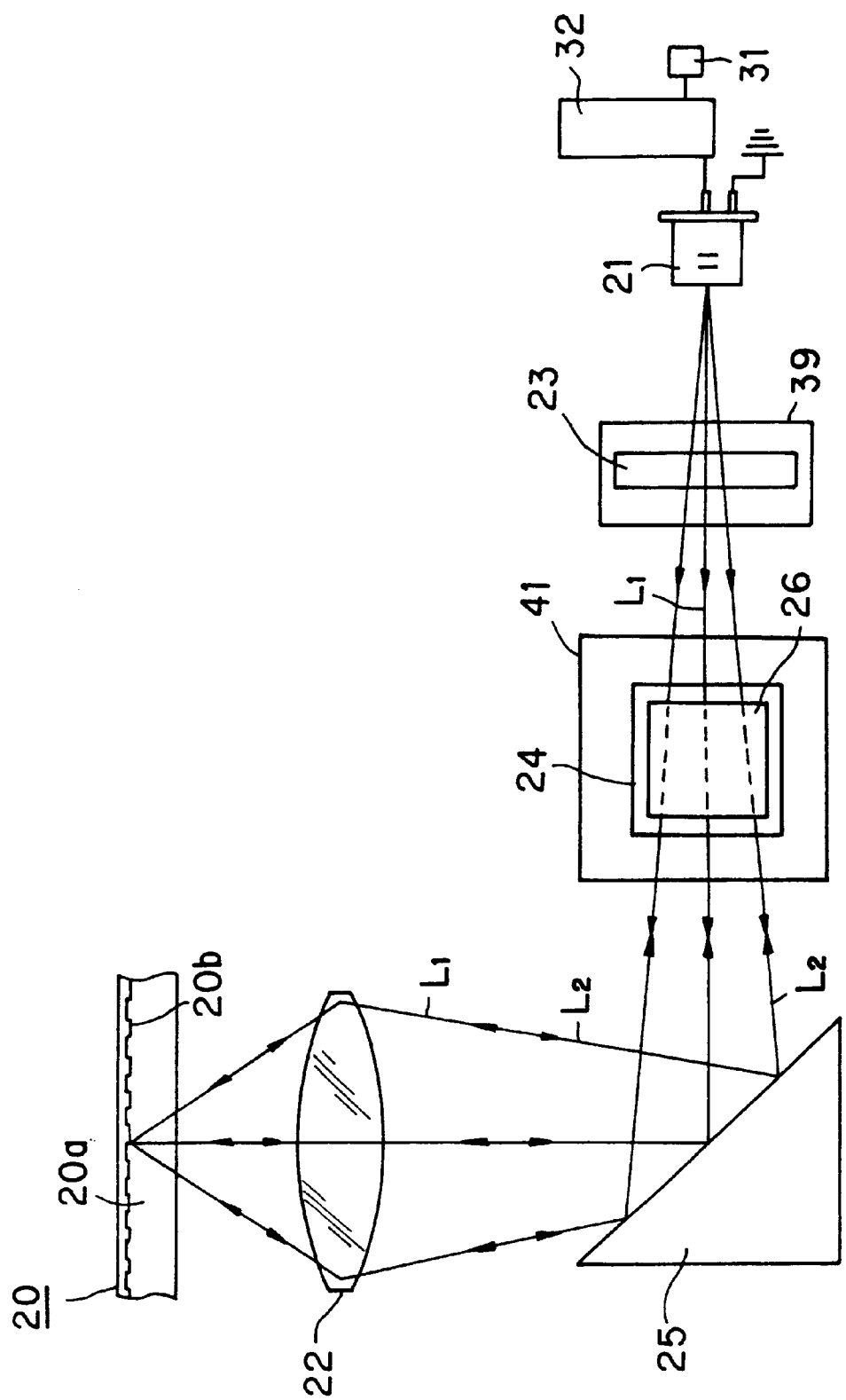
FIG. 7 is a side view showing the light path of a light beam in the optical pickup device shown in FIG. 4.

On the light path of the light beam $L_1$ proceeding from the semiconductor laser 21 to the objective lens 22 is a grating 23 positioned towards the semiconductor laser 21 for splitting the light beam $L_1$ from the semiconductor laser 21 into at least three diffracted light beams, namely a zero-order light beam and ±one order light beams, as shown in FIGS. 6 and 7.

It is noted that, in FIGS. 6 and 7, the three diffracted light beams are represented as a sole light beam and these three diffracted light beams are referred to simply as a light beam in keeping with the drawing.

On the light path from the grating 23 to the objective lens 22 are disposed a beam splitter 24 and a reflective mirror 25. The beam splitter 24 splits the light beam $L_1$ outgoing from the semiconductor laser 21 from a light beam $L_2$ reflected by the optical disc 20 to fall on the beam splitter via objective lens 22, while the reflective mirror 25 causes the light beam $L_1$ transmitted through the beam splitter 24 to be deflected 90° to fall on the objective lens 22 while causing the light beam $L_2$ reflected by the optical disc 20 and transmitted through the objective lens 22 to be deflected 90° to fall on the beam splitter 24.

The optical pickup device includes a photodetector 26, for detecting the return light beam $L_2$ reflected back from the optical disc 20 to read out the information signals recorded on the disc and for detecting focusing error signals and tracking error signals. The photodetector is comprised of a light detecting element, such as a photodiode. This photodetector 26 is arranged facing the beam splitter 24 at a position perpendicular to the light path from the semiconductor laser 21 to the objective lens 22 for detecting the return light beam $L_2$ the light path of which has been modified 90° by reflection by a boundary surface 24a of the beam splitter 24. Meanwhile, the boundary surface 24a of the beam splitter 24 is inclined 45° relative to the optical axis of the light beam incident on the beam splitter 24 for modifying the light path of the light beam by 90°.

In the light path from the beam splitter 24 to the photodetector 26 are arranged a Wollaston prism 27 for detecting the Kerr rotation angle of the return light beam $L_2$ reflected by the optical disc 1 and a cylindrical lens 28 for producing astigmatic aberration in the return light beam $L_2$ reflected back from the orifice plate 20. The Wollaston prism 27 is mounted as-one with the beam splitter 24.

In the optical pickup device according to the present invention, a photodiode 30 for receiving a light beam radiated towards the back surface of the semiconductor laser 21 is provided in a casing 29 housing the semiconductor laser 21, as shown in FIGS. 6 and 7. This photodiode 30 is used for detecting the intensity of the light beam radiated towards the back surface of the semiconductor laser 21. This detection output is supplied to the automatic control circuit 32 configured for controlling the intensity of the driving current supplied from a driving source 31 for driving the semiconductor laser 21. This automatic control circuit 32 is responsive to a detection output of the photodiode 30 for controlling the intensity of the driving current supplied from the driving source 31. In this manner, the semiconductor laser 21 is driven by the driving current the intensity of which is controlled responsive to the intensity of the light beam radiated from the semiconductor laser 21 for perpetually radiating the light beam $L_1$ of a constant output level.

Figure 4:
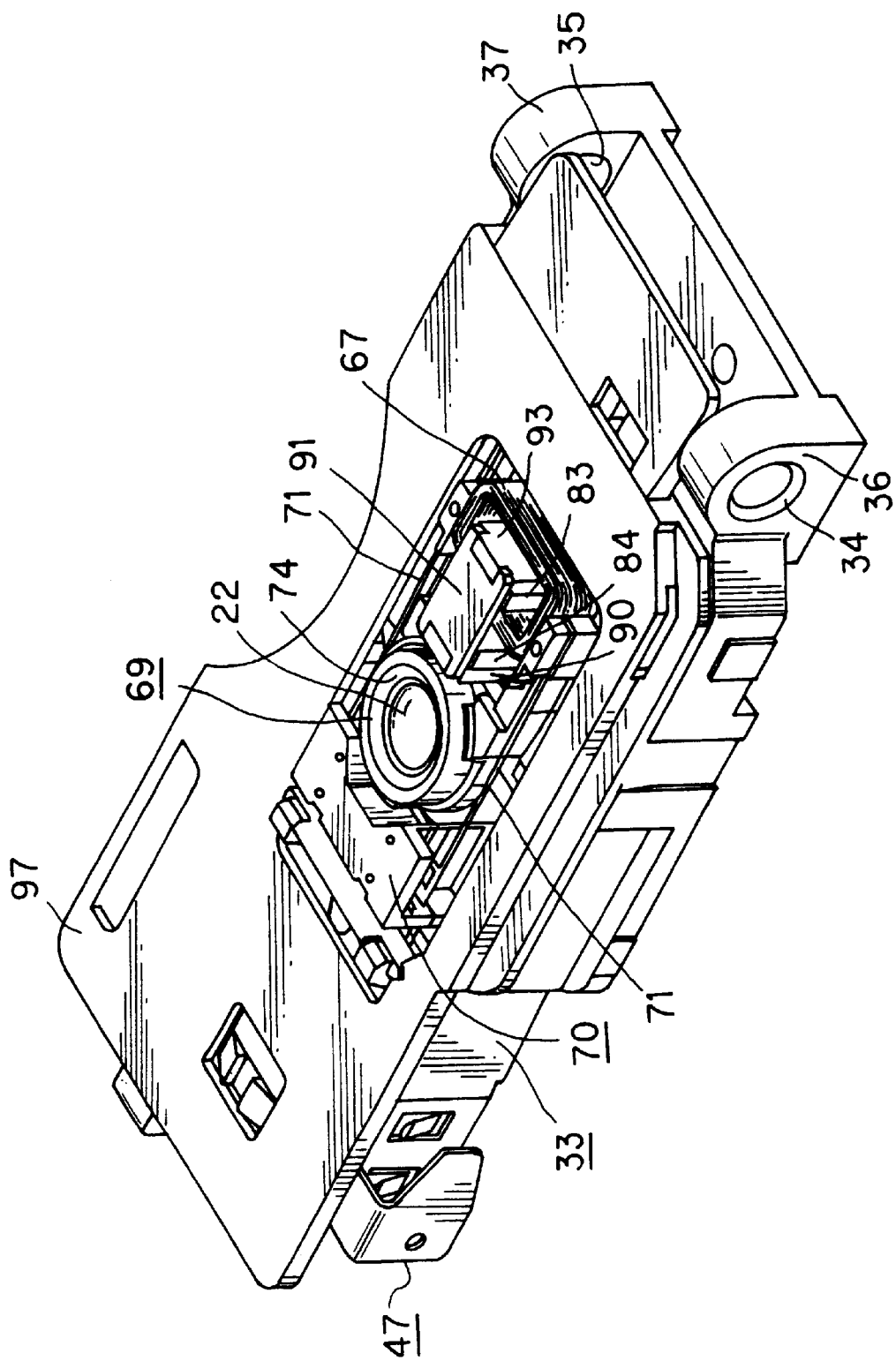
FIG. 4 is a perspective view showing an optical pickup device according to the present invention.
Figure 5:
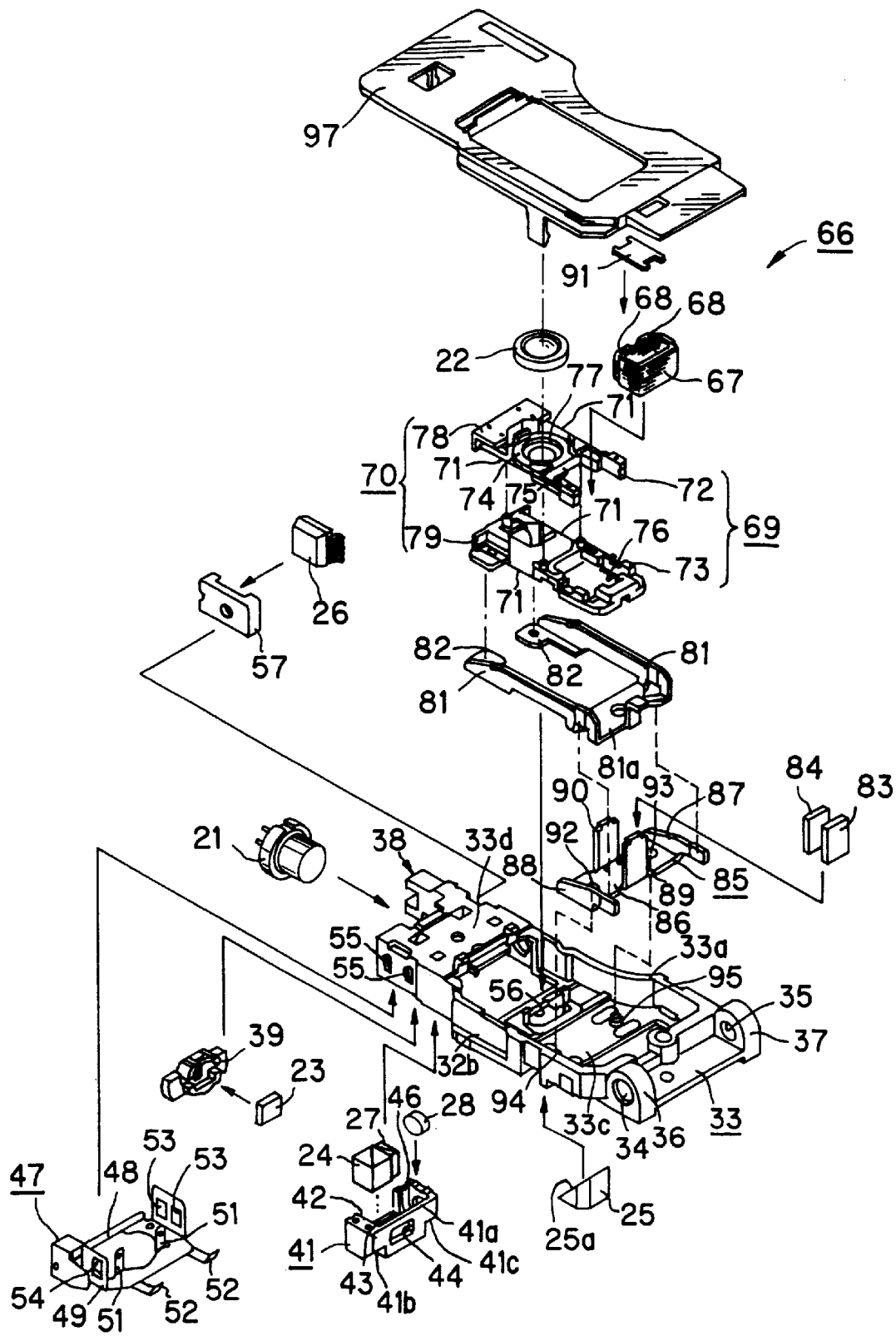
FIG. 5 is an exploded perspective view of the optical pickup device shown in FIG. 4.

The optical pickup device according to the present invention includes a base member 33 supported by a guide mechanism provided on the disc recording and/or reproducing apparatus when the optical pickup device is mounted thereon, as shown in FIGS. 4 and 5. This base member 33 is formed of a die-cast aluminum alloy or a synthetic resin material of high thermal resistance and high toughness in the form of a substantially rectangular frame. Specifically, the base member 33 has a pair of opposite sidewall sections 33a, 33b a bottom plate 33c provided across one side of these sidewall sections 33a, 33b and a top plate 33d provided across the opposite side of the sidewall sections 33a, 33b. On one end of the base member 33 are mounted a pair of supporting pieces 36, 37 formed with shaft holes 34, 35 passed through by a guide shaft constituting a guide mechanism provided on the disc recording and/or reproducing apparatus. On the opposite end of the base member 33 is mounted a guide support 38 of a U-shaped cross-section supported by a guide member constituting the guide mechanism in cooperation with the guide shaft.

The optical pickup device of the present invention is supported for movement in the direction of extension of the guide shaft by passing the guide shaft arranged parallel to the disc recording and/or reproducing apparatus through the shaft holes 34, 35 and by having the guide supported by the guide support 38.

The semiconductor laser 21 constituting the optical pickup device is mounted on the opposite side of the base member 33, as shown in FIG. 5. The grating 23, beam splitter 24 and the reflective mirror 25 are mounted on the base member 33 so that the optical axes thereof are aligned with one another. The grating 23 is mounted on a grating holder 39 using an adhesive and is mounted via this grating holder 39 on a mounting portion, not shown, provided on the inner surface of the top plate 33d of the base member 33. The grating holder 39 is formed of a synthetic resin material of an opaque black color for preventing the light reflected by the holder 39 or the light outside of the holder 39 from entering the grating 23.

The beam splitter 24 is mounted as-one with the Wollaston prism 27 and is mounted along with the cylindrical lens 27 on a holder 41 so as to be mounted on the base member 33 via this holder 41.

Figure 8:
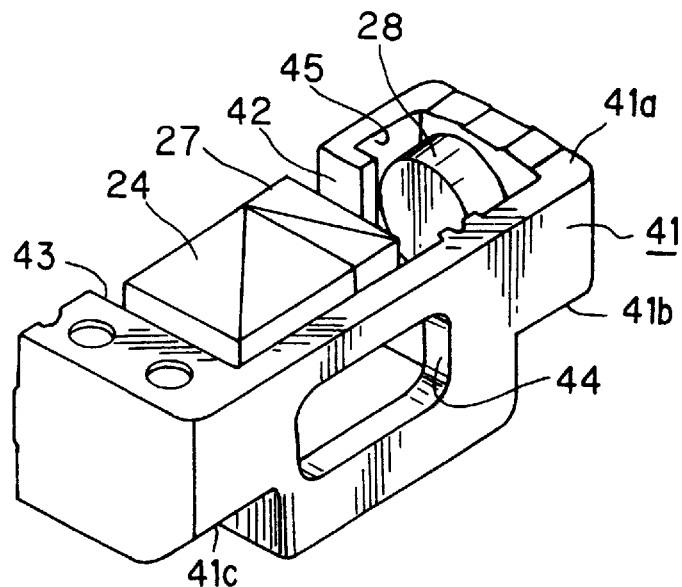
FIG. 8 is a perspective view showing a holder for holding a beam splitter.

The holder 41 for mounting the beam splitter 24 thereon is formed of metal, such as aluminum or magnesium alloy or a synthetic resin material having superior thermal resistance and toughness in the form of a casing as shown in FIGS. 5 and 8. A first opening 42 into which is intruded the light beam $L_1$ radiated from the semiconductor laser 21 is formed in a lateral side of the holder 41. Within the holder 41 is mounted a first mounting portion 43 for mounting the beam splitter 24 on a straight line passing through the first opening 42. The beam splitter 24, formed as-one with the Wollaston prism 27, is mounted on the first mounting portion 43 using an adhesive.

In the opposite side of the holder with respect to the first opening 42 is formed a second opening 44 through which the light beam $L_1$ transmitted through the beam splitter 24 is passed and through which the return light beam $L_2$ reflected back from the optical disc 20 is caused to fall on the beam splitter 24.

Within the inside of the holder 41 is mounted a second mounting portion 45 in a side-by-side relation to the first mounting portion 43. The second mounting portion 45 is used for mounting in position the cylindrical lens 28 which is an optical element arranged between the beam splitter 24 and the photodetector 26. The cylindrical lens 28 is mounted on the second mounting portion 45 with its optical axis extending at right angles to a straight line passing through the first opening 42 and the second opening 44 so that the cylindrical lens 28 will face the Wollaston prism 27 mounted on the beam splitter 24. The cylindrical lens 28 also is mounted using an adhesive on the second mounting portion 45.

In an end face of the holder 41 extending at right angles to the lateral sides of the holder 41 formed with the first and second openings 42, 44 is formed a third opening 46 for permitting the light beam $L_2$ passed through the cylindrical lens 28 to fall on the photodetector 26.

The holder 41 is mounted on the base member 33 with the optical axis of the light beam $L_1$ outgoing from the semiconductor laser 21 coincident with the optical axis of the beam splitter 24. The holder 41 is supported in pressure contact by the top plate 33d of the base member 33 by a holder supporting plate 47 mounted on the base member 33 along with the semiconductor laser 21 and the grating holder 39.

The holder supporting plate 47 is formed by punching and warping a resilient metal plate and, as shown in FIG. 5, has a pair of fitting lugs 49, 50 for fitting on the outer sides of the facing sidewall sections 33a, 33b of the base member 33. The fitting lugs 49, 50 are formed on both sides of a plate-shaped support 48 adapted for thrusting the semiconductor laser 21 and the grating holder 39 against the outer sides of the facing sidewall sections 33a, 33b of the base member 33. The holder supporting plate 47 is also formed with a pair of grating holder supporting pieces 51, 51 by segmenting part of the support 48. Also, a pair of holder support lugs 52, 52 are formed for protruding from a side of the support 48.

The holder supporting plate 47 is mounted on the base member 33 by having the fitting lugs 49, 50 fitted on the outer sides of the sidewall sections 33a, 33b of the base member 33. The holder supporting plate 47 is mounted in position with respect to the base member 33 by an engagement protrusion 55 formed on the outer sides of the sidewall sections 33a, 33b engaged in enragement holes 53, 54 formed in the fitting lugs 49, 50.

With the holder supporting plate 47 thus mounted on the base member 33, the semiconductor laser 21 and the grating holder 39 are thrust towards the top plate 33d of the base member 33 by the support 48 for setting the mounting position thereof relative to the base member 33. The grating holder 39 is also set in its mounting position relative to the beam splitter 24 mounted via holder 41 on the base member 33 by having its surface perpendicular to the optical axis of the grating 23 supported by the grating holder supporting pieces 51, 51. In addition, the holder 41 has its mounting position relative to the base member 33 set by being supported by the paired holder support pieces 52, 52 protruded from the support 48 for being thrust against and supported by the top plate 33d of the base member 33.

The surface 41a of the holder 41 abutted against the top plate 33d of the base member 33 and the surfaces 41b, 41c thereof supported by the holder support lugs 52, 52 are planar surfaces and are supported for adjustable movement relative to the base member 33. The holder 41 is secured to the base member 33 by an adhesive after the holder 41 is adjusted in its mounting position on the holder support plate 47. Since the holder is adjustable in its movement, the distance between the photodetector 26 and the beam splitter 24 mounted on the holder 41 can be adjusted, thus enabling adjustment of the light receiving state of the light beam $L_2$ on the light receiving surface of the photodetector 26.

On the bottom plate 33c of the base member 33 is mounted the reflective mirror 25 for causing the light beam $L_1$ radiated from the semiconductor laser 21 and transmitted through the beam splitter 24 to be deflected 90° to fall on the objective lens 22 as well as causing the light beam $L_2$ reflected by the optical disc 20 and transmitted through the objective lens 22 by 90° to fall on the beam splitter 24. This reflective mirror 25 is mounted by being fitted in a mounting hole 56 formed in the bottom plate 33c of the base member 33 so that the optical axis of the reflective mirror 25 is coincident with that of the beam splitter 24 and so that the reflective surface 25a is at an angle precisely of 45° relative to the optical axis proceeding from the beam splitter 24 to the reflective mirror 25.

On the sidewall 33a of the base member 33 is mounted the photodetector 26 via a detector holder 56. Since the photodetector 26 detects the return light beam $L_2$ reflected by the optical disc 20 and by the boundary surface 24a of the beam splitter 24 so as to be changed in light path by 90°, the photodetector 26 is mounted on the sidewall section 33a for facing the beam splitter 24 at a position perpendicular to the light path extending from the semiconductor laser 21 to the objective lens 22. The portion of the sidewall section 33a facing the photodetector 26 is formed with a through-hole in which is transmitted the return light beam $L_2$.

Figure 9:
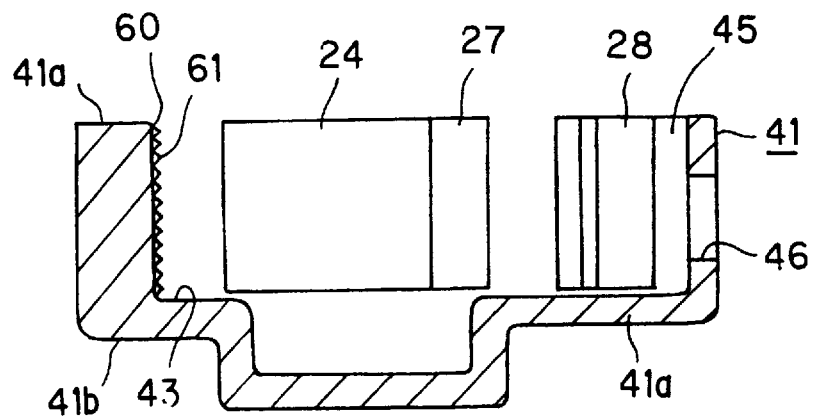
FIG. 9 is a cross-sectional view showing the holder of FIG. 8.

In the inner surface of the holder 41 are formed irregularities 61 operating as a stray light removing mechanism for scattering the light beam $L_3$ for preventing the light beam from falling on the beam splitter 24 or the photodetector 26. The light beam $L_3$ is part of the light beam $L_1$ radiated from the semiconductor laser 21 and reflected by the boundary surface 24a of the beam splitter 24 to form stray light components directed to outside of the beam splitter 24. These irregularities are configured for scattering to outside of the beam splitter 24 the part of the light beam $L_1$ radiated from the semiconductor laser 21 and reflected by the boundary surface 24a of the beam splitter 24 and hence are formed in the proceeding direction of the light beam $L_3$. That is, the irregularities 61 are formed on an inner surface 60 of the holder 41 at such a position that it is perpendicular to the optical axis of the light beam $L_1$ radiated from the semiconductor laser 21 and that it faces the cylindrical lens 28 with the beam splitter 24 in-between, as shown in FIGS. 6 and 9. Since the irregularities 61 are formed in this manner on the inner surface 60 of the holder 41, the light beam $L_3$ radiated from the semiconductor laser 21 and reflected by the boundary surface 24a of the beam splitter 24 so as to be directed to outside the beam splitter 24 is scattered by the irregularities 61 or changed in its proceeding direction and hence is prevented from entering the beam splitter 24, while being prevented from proceeding as stray light towards the photodetector 16.

In this case, the irregularities 61 may be provided on the entire inner surface 60 of the holder 41. The irregularities 61 are suitably sized to scatter the light beam $L_3$ directed to outside of the beam splitter 24.

The inner and outer surfaces of the holder 41 are colored in black for suppressing the amount of reflection on the inner surface of the holder 41 of the light beam $L_3$ reflected by the boundary surface 24a of the beam splitter 24 towards the outside of the beam splitter 24 for suppressing the incidence thereof towards the beam splitter 24 to proceed as stray light towards the photodetector 26. Since the inner and outer surfaces of the holder 41 are colored in black, the light from outside the holder 41 may be prevented from entering the inside of the holder 41.

The inner and outer surfaces of the holder 41 can be colored in black by coating the inner and outer surfaces of the holder 41 with a black paint or by molding the holder with a synthetic resin material of black color.

Figure 10:
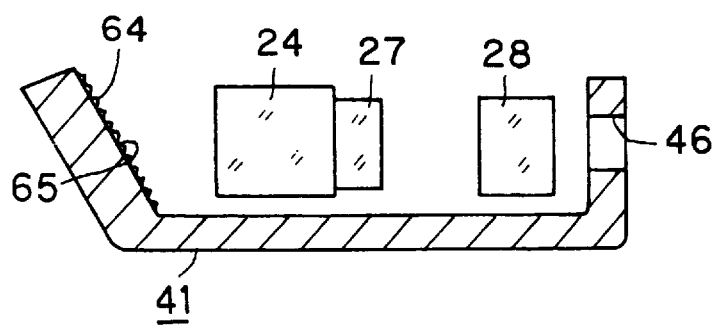
FIG. 10 is a cross-sectional view showing another example of a holder for holding a beam splitter.

For preventing the light beam $L_3$ radiated from the semiconductor laser 21 and reflected by the boundary surface 24a of the beam splitter 24 towards the outside of the beam splitter 24 from being reflected by the inner surface of the holder 41 to fall on the beam splitter 24 to proceed as stray light towards the photodetector 26, the surface of the holder 41 facing the beam splitter 24 may be formed as an inclined surface 65 inclined with respect to the optical axis extending from the beam splitter 24 to the photodetector 26, as shown in FIG. 10. By having the surface of the holder facing the beam splitter 24 as the inclined surface 65, the light beam $L_3$ radiated by the semiconductor laser 21 and reflected by the boundary surface 24a of the beam splitter 24 towards the outside of the beam splitter 24 can be reflected in a direction not proceeding towards the beam splitter 24 for preventing the light beam from entering the beam splitter 24 and from proceeding as stray light towards the photodetector 26. At this time, micro-sized irregularities 64 may be formed on the inclined surface 65 for scattering the light beam $L_3$ proceeding towards the outside of the beam splitter 24.

The objective lens 22 for converging the light beam $L_1$ radiated by the semiconductor laser 21 and reflected by the reflective mirror 25 on the optical disc 20 and for causing the light beam $L_2$ reflected by the optical disc 20 to fall on the reflective mirror 25 is arranged facing the reflective mirror 25 with the optical axis of the lens 22 lying at right angles with the optical axis proceeding from the semiconductor laser 21 to the reflective mirror 25. The objective lens 22 is supported by an objective lens driving device 66 for displacement in the focusing direction parallel to the optical axis of the objective lens 22 and in the planar tracking direction perpendicular to the optical axis of the objective lens 22.

Referring to FIG. 5, the objective lens driving device 66 includes a bobbin 69 holding the objective lens 22, and a plurality of linear resilient supports 71 for supporting the bobbin 69 on a stationary unit 70 for displacement in the focusing direction and in the tracking direction. On the bobbin 69 are mounted a focusing coil 67 fed with focusing error signal for displacing the objective lens 22 in the focusing direction and a pair of tracking coils 68, 68 for displacing the objective lens 22 in the tracking direction.

The bobbin 69 is made up of an upper bobbin half 72 and a lower bobbin half 73 bonded or connected to each other with an adhesive. The upper bobbin half 72 and the lower bobbin half 73 are molded from a synthetic resin material having superior thermal resistance and high toughness, such as PPS resin. The upper bobbin half 72 has an objective lens mounting portion 74 and a U-shaped coil mounting portion 75 at its distal and proximal ends, respectively. The lower bobbin half 73 has a hollow coil mounting hole 76 at its mid portion and is formed as a substantially rectangular frame and is connected to the upper bobbin half 72 with the coil mounting hole 76 in register with the coil mounting portion 75. The objective lens 22 is mounted in position by fitting in a circular lens mounting hole 77 formed in the objective lens mounting portion 74. The focusing coil 67 is wound in a rectangular cylinder and is mounted across the coil mounting portion 75 of the upper bobbin half 72 and the coil mounting hole 76 in the lower bobbin half 73. The paired tracking coils 68, 68 are wound in a flat rectangular form and mounted on a lateral side on the outer periphery of the focusing coil 67 and is mounted on the bobbin 69 via the focusing coil 67.

The stationary unit 70 is made up of an upper half stationary portion 78 and a lower half stationary portion 79 connected together with an adhesive. The upper half stationary portion 78 of the stationary unit 70 and the upper bobbin half 72 of the bobbin 69 are interconnected by a pair of parallel resilient supports 71, while the lower half stationary portion 79 of the stationary unit 70 and the lower bobbin half 73 of the bobbin 69 are interconnected by another pair of parallel resilient supports 71.

The stationary unit 70, carrying the bobbin 69 via plural resilient supports 71, is mounted across mounting pieces 82, 82 provided towards an opening end of a U-shaped mounting substrate 81, as shown in FIG. 5. On a connecting portion 81a towards the proximal end of the mounting substrate 81 is mounted a yoke 85 for carrying a pair of magnets 83, 83 configured for generating a driving force for driving and displacing the objective lens 22 in the focusing direction and in the tracking direction. This yoke 85 has a connecting web 86 on both sides of which are formed upright a pair of mounting pieces 87, 88. On the sides of the connecting web 86 perpendicular to the sides carrying the connecting pieces 87, 88 are formed upright a pair of magnet mounting pieces 89, 90. The yoke 85 is mounted on the lower surface of the mounting substrate 81 by fitting the paired mounting pieces 87, 88 on both sides of the mounting substrate 81. The yoke 85 is mounted in position by soldering the paired mounting pieces 87, 88 on both sides of the mounting substrate 81. The paired magnets 83, 84 are bonded with an adhesive to facing sides of the paired magnet mounting pieces 89, 90. The paired magnet mounting pieces 89, 90 are interconnected by a connecting yoke 91 mounted on the distal ends of the mounting pieces 89, 90, as shown in FIG. 4. By supporting the paired magnet mounting pieces 89, 90, the connecting yoke 91 maintains a constant distance between the paired magnets 83, 84.

The mounting substrate 81 is mounted on the bottom plate 33c of the base member 33 via yoke 85 mounted on the mounting substrate 81. That is, the mounting substrate 81 is mounted in position relative to the base member 33 by having paired positioning protrusions 94, 95 set upright on the bottom plate 33c of the base member 33 engaged in paired positioning holes 92, 93 formed in the connecting piece 86 of the yoke 85.

Meanwhile, when the bobbin 69 is supported via stationary unit 70 on the mounting substrate 81 carrying the yoke 85, the magnet 83 mounted on the yoke 85 is inserted into the tubular focusing coil 67, while the opposite side magnet 84 faces the tracking coils 68, 68 mounted on a lateral side of the focusing coil 67.

With the above-described objective lens driving device 66, if focusing error signals are supplied to the focusing coil 67, there is generated a driving force of displacing the bobbin 89 in a direction parallel to the optical axis of the objective lens 22 for displacing the objective lens 22 in the direction parallel to the optical axis by way of focusing control. On the other hand, if the tracking error signal is supplied to the tracking coils 68, 68, there is generated a driving force of displacing the bobbin 89 in a planar direction perpendicular to the optical axis of the objective lens 22 for displacing the objective lens 22 in the planar direction perpendicular to the optical axis by way of tracking control.

The upper part of the base member 33 is covered with a cover plate 97, as shown in FIG. 4.

With the above-described optical pickup device, the light beam $L_1$ radiated from the front side of the semiconductor laser 21 is incident on the grating 23 in the state of the scattered light. The light beam $L_1$ incident on the grating 23 is scattered by the grating 23 into at least three diffracted light beams, namely a zero-order light beam and ±1 order light beams. It is noted that, in FIGS. 6 and 7, the three diffracted light beams are represented as a sole light beam. In the following description, these three diffracted light beams, namely the zero-order light beam and ±1 order light beams, are referred to simply as a light beam in keeping with the drawing. The light beam $L_1$ outputted by the grating 23 is passed through the beam splitter 24 to reach the reflective mirror 25. When transmitted through the beam splitter 24, part of the light beam $L_1$ from the semiconductor laser 21 is reflected by the boundary surface 24a of the beam splitter 24 towards the inner surface 60 of the holder 41 facing the beam splitter 24. However, the major portion of the light beam $L_1$ is transmitted through the boundary surface 24a of the beam splitter 24 to reach the reflective mirror 25. On the inner surface 60 facing the beam splitter 24, there are formed irregularities 61, or the inner surface 60 is formed as the inclined surface 65, as explained previously. Thus, the light beam $L_3$ from the semiconductor laser 21 reflected by the boundary surface 24a is scattered or has its proceeding direction changed, so that the light beam $L_3$ cannot proceed as stray light beam towards the photodetector 26 positioned on the reflecting side of the holder 41. Since the inner and outer surfaces of the holder 41 are colored in black, the light beam $L_3$ is attenuated from the semiconductor laser 21 reflected by the boundary surface 24a and hence cannot reach the photodetector 26.

The light beam $L_1$ incident on the reflective mirror 25 has its light path changed 90° by the reflective mirror 25 and hence is directed to the objective lens 22. The light beam $L_1$ reflected by the reflective mirror 25 is converged by the objective lens 22 on the signal recording surface 20a of the optical disc 20. The light beam $L_2$, reflected by the signal recording surface 20a of the optical disc 20, is again incident via objective lens 22 on the optical pickup device so as to be again changed in its light path by the reflective mirror 25. The light beam $L_2$, having its light path changed 90° by the reflective mirror 25, is incident on the beam splitter 24 so as to be reflected 90° by the boundary surface 24a. The light beam $L_2$, reflected by 90° by the boundary surface 24a, has the Kerr rotation angle detected by the Wollaston prism 27 and received via cylindrical lens 28 by the photodetector 26.

At this time, astigmatic aberration is generated in the light beam $L_2$ reflected by 90° by the boundary surface 24a of the beam splitter 24, depending on changes in the distance between the objective lens 22 and the signal recording surface 20a of the optical disc 20. Since the spot shape is changed in this manner on the light receiving surface of the photodetector 26 depending on the changes in the distance between the signal recording surface 20a and the objective lens 22, focusing error signals can be generated based on an output signal of the photodetector 26. On the other hand, the light spots associated with the ±one order diffracted light on the light receiving surface of the photodetector 26 are moved depending on how much the light spots of the ±one order diffracted light beams on both sides of the above-mentioned zero-order diffracted light illuminated on the signal recording surface 20a of the optical disc 20. The result is that the output signal of the photodetector 26 is changed so that the tracking error signals can be produced based on the change in the output signal of the photodetector 26. The focusing error signals and the tracking error signals thus generated are supplied to the focusing coil 67 and the tracking coils 68, 68 of the objective lens driving device 66, respectively. The result is that focusing control and tracking control are performed in which the bobbin 69 is moved in the focusing and tracking directions by the focusing coil 67, tracking coils 68, 68 and by the magnets 83, 84.

The information signals recorded on the optical disc 20 can be read from the photodetector 26 based on the output signal which has received the zero-order diffracted light.

With the above-described optical pickup device according to the present invention, the light beam $L_3$ radiated from the semiconductor laser 21 so as to be reflected by the boundary surface 24a of the beam splitter 24 and by the inner surface of the holder 41 is scattered by the irregularities 61 or the inclined surface 65, it becomes possible to prevent the light beam $L_3$ from interacting with the light beam $L_1$ incident on the beam splitter 24 to be then reflected again by the boundary surface 24a of the beam splitter 24 so as to be radiated by the semiconductor laser 21 to produce resonance to generate the scoop noise. In addition, the light beam can be prevented from entering the photodetector 26 as the stray light. Therefore, the photodetector 26 can accurately detect only the light beam $L_2$ reflected by the optical disc 20 and by the boundary surface 24a of the beam splitter 24, thus enabling detection of the focusing error signals and the tracking error signals to high precision as well as accurate control of the objective lens 22 in the focusing direction and in the tracking direction. The recording track 20b of the optical disc 20 can be correctly scanned by the light beam $L_1$ radiated from the objective lens 22 towards the optical disc 20 thus enabling correct readout of the information signals recorded on the optical disc 20. In addition, since the photodetector 26 can correctly detect only the light beam $L_2$ reflected from the optical disc 20, the information signals recorded thereon can be read out correctly.

INDUSTRIAL APPLICABILITY

With the above-described optical pickup device according to the present invention, since the light beam radiated from the semiconductor laser so as to be reflected by the boundary surface of the beam splitter and by the inner surface of the holder to prove to be stray light components is scattered and prevented from entering the photodetector, focusing error signals and tracking error signals can be detected to high accuracy by the photodetector to enable the information signals recorded on the optical disc to be read out to high accuracy.

What is claimed is:

1. An optical pickup device comprising:
    a light source;
    an objective lens converging a light beam outgoing from said light source;
    a beam splitter arranged between the light source and the objective lens for splitting the light beam radiated from the light source from a light beam incident thereon via said objective lens;
    a photodetector for receiving the light beam split by said beam splitter and incident thereon via said objective lens; and
    means for removing stray light components generated when the light beam radiated from the light source is passed through said beam splitter by preventing the stray light components from entering the beam splitter and the photodetector.

2. The optical pickup device as claimed in claim 1 further comprising:
    a holder for holding at least said beam splitter, and wherein said removing means is provided at a position of said holder facing said beam splitter.

3. The optical pick-up device as claimed in claim 2 further comprising:
    a base member on which at least said light source and the photodetector are mounted; and wherein said holder has an opening via which a light beam from said light source is intruded and a mounting portion for mounting said beam splitter, said mounting portion being arranged on a straight line passing through said opening, said holder including a planar surface for abutment against said base member and for adjustment in movement of said holder on said base member.

4. The optical pickup device as claimed in claim 3 further comprising:
    an optical element arranged between said beam splitter and the photodetector, said optical element being arranged substantially at right angles with a straight line passing through said opening in said holder at a position of facing said removing means with said beam splitter in-between.

5. The optical pickup device as claimed in claim 2 in which said removing means is constituted by irregularities formed on a lateral side of said holder.

6. The optical pickup device as claimed in claim 2 in which said removing means is constituted by an inclined surface formed on a lateral side of said holder.

7. An optical pickup device comprising:
    a light source;
    an objective lens for converging a light beam outgoing from said light source;
    a beam splitter arranged between the light source and the objective lens for splitting the light beam radiated from the light source from a light beam incident thereon via said objective lens;
    a photodetector for receiving the light beam split by said beam splitter and incident thereon via said objective lens;
    a base member for mounting at least the light source and the photodetector;
    a holder having an opening via which a light beam from said light source is intruded and a mounting portion for mounting said beam splitter, said mounting portion being arranged on a straight line passing through said opening, said holder including a planar surface for abutment against said base member and mounted for adjustment in movement on said base member; and an optical element arranged between said beam splitter and the photodetector, said optical element being arranged substantially at right angles with a straight line passing through said opening in said holder at a position of facing a removing means with said beam splitter in-between, wherein said removing means removes stray light components generated when the light beam radiated from the light source is passed through said beam splitter by preventing the stray light components from entering the beam splitter and the photodetector.

8. The optical pickup device as claimed in claim 7 wherein said removing means is provided at a position of facing said optical element with said holder and the beam splitter in-between.

9. The optical pickup device as claimed in claim 8 wherein said removing means is constituted by irregularities formed on a lateral side of said holder.

10. The optical pickup device as claimed in claim 8 wherein said removing means is constituted by an inclined surface formed on a lateral side of said holder.

* * * * *